United States Patent

Noda et al.

[11] Patent Number: 6,066,682
[45] Date of Patent: *May 23, 2000

[54] FOAMS AND PROCESSES FOR THEIR PRODUCTION

[75] Inventors: Kimihiko Noda; Satoshi Sasaki; Tsuyoshi Tomosada, all of Kyoto, Japan

[73] Assignee: Sanyo Chemical Industries, Ltd., Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/774,016

[22] Filed: Dec. 26, 1996

[30] Foreign Application Priority Data

Dec. 25, 1995 [JP] Japan ..................... 7-351790
Jul. 25, 1996 [JP] Japan ..................... 8-215401

[51] Int. Cl.$^7$ ........................................ C08J 9/06
[52] U.S. Cl. ..................... 521/149; 521/92; 521/125; 252/609
[58] Field of Search ..................... 252/307, 609; 521/91, 92, 93, 149, 907, 125; 523/179; 516/19

[56] References Cited

U.S. PATENT DOCUMENTS

| | | | |
|---|---|---|---|
| T952,009 | 11/1976 | Lawson et al. | 521/92 |
| 4,119,583 | 10/1978 | Filip et al. | 521/103 |
| 4,215,202 | 7/1980 | Park | 521/81 |
| 4,596,832 | 6/1986 | Ariga et al. | 521/58 |
| 4,769,179 | 9/1988 | Kato et al. | 252/609 |
| 4,808,637 | 2/1989 | Boardman et al. | 521/50.5 |
| 5,154,713 | 10/1992 | Lind | 521/149 |
| 5,264,495 | 11/1993 | Irie et al. | 521/149 |
| 5,340,840 | 8/1994 | Park et al. | 521/149 |
| 5,451,613 | 9/1995 | Smith et al. | 521/149 |
| 5,945,461 | 8/1999 | Gosiewski et al. | 521/125 |

FOREIGN PATENT DOCUMENTS

| | | | |
|---|---|---|---|
| 57-144731 | 9/1982 | Japan . | |
| 03 269 028 | 11/1991 | Japan | 521/92 |

OTHER PUBLICATIONS

Database WPAT Questel, week 8241, London: Derwent Publications Ltd., AN 82–8737E/41, Class A32, J57144731–A (Mitsui Polychem), abstract, 1982.
Patent Abstracts of Japan, vol. 6, No. 249 (M–177), 1982, Month Unknown JP 57–144731–A (Du Pont Mitsui Polychem Co Ltd), abstract.
Derwent Abstracts, week 9203, London: Derwent Publications Ltd., AN– 92–020270/03, Class A17, J 03 269 028 A, (Nippon Petrochem KK), abstract, 1992.

*Primary Examiner*—Richard D. Lovering
*Assistant Examiner*—Daniel S. Metzmaier
*Attorney, Agent, or Firm*—Pollock, Vande Sande & Amernick

[57] ABSTRACT

A foam comprising a metal salt-crosslinked cellular (co) polymer (A) obtained by polymerizing a monomer charge comprising an α, β-unsaturated carboxylic acid and optionally one or more other vinyl monomers, wherein at least part of said monomer charge is concurrently foamed and polymerized in the presence of a metal salt of carbonic acid, and processes for producing them. Low-density foams that are benign to the environment and can be easily produced can be provided.

9 Claims, No Drawings

FOAMS AND PROCESSES FOR THEIR PRODUCTION

TECHNICAL FIELD

The present invention relates to novel foams of value as a heat insulator, a structural member, a protector, or a soundproof material, for instance, and to processes of producing the foams.

BACKGROUND OF THE INVENTION

The foam heretofore known includes polyurethane, polyurea, polystyrene, polyolefin, and polycyclopentadiene foams. In addition, as an innovation conducive to improved productivity of polyolefin foam, an ionomer foam produced by reacting a carboxyl group-containing copolymer with a metal carbonate (Japanese Kokoku Publication Hei-2-11621) has been proposed.

However, the conventional foams have several drawbacks: use of raw materials unfriendly to the environment, evolution of noxious gases and soot due to incomplete combustion, excessive generation of heat of combustion during incineration which detracts from the serviceable life of the incinerator, and generation of static electricity. The ionomer foam is also disadvantageous in that the starting carboxyl group-containing copolymer is either a solid or a super-high-viscosity liquid which requires a melt-kneading extruder capable of high temperature and high pressure services and that the expansion ratio is as small as about 2 to 5, thus failing to provide only a low-density foam. Furthermore, when the carboxyl group-containing copolymer is dissolved in water or an organic solvent to reduce its viscosity and fed to a low-pressure foaming machine, the insufficient foam strength tends to result in collapse of cells, thus failing to give a foam of low density. In addition, because the density of the foam is not sufficiently low, the temperature-time area and the emitting smoke factor are markedly increased in the test for incombustibility (JIS A-1321) so that the requirements for flame retardancy grades 1 to 3 are not satisfied.

The inventors of the present invention explored into low-density foams that would be benign to the environment and could be easily produced, for example using a low-pressure foaming machine. The present invention is the result of this research endeavor.

SUMMARY OF THE INVENTION

The present invention is directed to a foam comprising a metal salt-crosslinked cellular homopolymer or copolymer (A) obtained by polymerizing a monomer charge comprising an $\alpha$, $\beta$-unsaturated carboxylic acid and optionally one or more other vinyl monomers, wherein at least part of said monomer charge is concurrently foamed and polymerized in the presence of a metal salt of carbonic acid; a process for producing a foam which comprises causing a monomer charge comprising an $\alpha$, $\beta$-unsaturated carboxylic acid and optionally one or more other vinyl monomers, to undergo concurrent foaming and crosslinking-polymerization in the presence of a metal salt of carbonic acid and a polymerization initiator, where necessary, under heating; and a process for producing a foam which comprises causing an $\alpha$, $\beta$-unsaturated carboxylic acid homopolymer or copolymer (B) obtained by polymerizing an $\alpha$, $\beta$-unsaturated carboxylic acid and optionally one or more other vinyl monomers, and a monomer charge comprising an $\alpha$, $\beta$-unsaturated carboxylic acid and/or one or more other vinyl monomers, to undergo concurrent foaming and crosslinking-polymerization in the presence of a metal salt of carbonic acid and polymerization initiator, where necessary, under heating.

DETAILED DESCRIPTION OF THE INVENTION

The $\alpha$, $\beta$-unsaturated carboxylic acid in the context of the present invention includes but is not limited to acrylic acid, methacrylic acid, itaconic acid, maleic acid, fumaric acid, and cinnamic acid, inclusive of salts thereof. The salts may be salts with alkali metals (e.g. sodium, potassium, rubidium, etc.), alkaline earth metals (e.g. magnesium, calcium, barium, etc.), typical metals (e.g. aluminum, germanium, tin, etc.), and transition metals (e.g. iron, cobalt, nickel, copper, zinc, etc.).

Among these monomers, acrylic acid, methacrylic acid, and their salts are preferred from the standpoint of cost.

The other vinyl monomer that can be used in the present invention includes a variety of known monomers, viz. water-soluble monovinyl monomers such as (meth)acrylamide, vinylpyrrolidone, hydroxyethyl (meth)acrylate, addition product of (meth)acrylic acid with alkylene oxides, (meth)acryloyl polyoxymethylenemethyl ether, 2-(meth)acryloylamino-2-methylpropanesulfonic acid and its salt, vinylsulfonic acid and its salt, styrenesulfonic acid and its salt, itaconic acid and its salt, maleic acid and its salt, etc. and oil-soluble monovinyl monomers such as styrene, $\alpha$-methylstyrene, methyl (meth)acrylate, acrylonitrile, vinyl acetate, etc.

The $\alpha$, $\beta$-unsaturated carboxylic acid homopolymer or copolymer (B) is a polymer obtainable by polymerizing one or more kinds of said $\alpha$, $\beta$-unsaturated carboxylic acid, optionally together with one or more kinds of said other vinyl monomers. Such homopolymer or copolymer can be produced by the known polymerization technology under the known conditions. Thus, methods for initiating the polymerization reaction and typical catalysts are disclosed inter alia in Japanese Kokoku Publications Sho-63-221843 and Sho-63-445.

The weight of the $\alpha$, $\beta$-unsaturated carboxylic acid monomer constituting said $\alpha$, $\beta$-unsaturated carboxylic acid homopolymer or copolymer (B) is generally not less than 20% and preferably not less than 30% based on the weight of the $\alpha$, $\beta$-unsaturated carboxylic acid homopolymer or copolymer (B). If the proportion is less than 20%, the fame retardancy of the product foam will be inadequate.

Polyfunctional vinyl monomers can be used as part of said one or more other vinyl monomers for use in the present invention. The polyfunctional vinyl monomer that can be used includes divinylbenzene, ethylene glycol di(meth)acrylate, polyethylene glycol di(meth)acrylate, propylene glycol di(meth)acrylate, polypropylene glycol di(meth)acrylate, trimethylolpropane poly(meth)acrylate, glycerol poly(meth)acrylate, pentaerythritol poly(meth)acrylate, diallyl phthalate, ethylene glycol diallyl ether, and polyethylene glycol diallyl ether, among others. Among these polyfunctional vinyl monomers, poly(meth)acrylates are preferred from the standpoint of foam quality.

The proportion of the polyfunctional vinyl monomer can be freely selected according to the intended application but is generally not greater than 70 weight % based on the total weight of the vinyl monomer component and in view of product foam quality and cost, is preferably not greater than 50 weight % and, for still better results, not greater than 40 weight %.

The metal of said metal salt of carbonic acid includes monovalent metals such as alkali metals (e.g. sodium, potassium, rubidium, etc.) and polyvalent metals such as alkaline earth metals (e.g. magnesium, calcium, barium, etc.), typical metals (e.g. aluminum, germanium, tin, etc.), and transition metals (e.g. iron, cobalt, nickel, copper, zinc, etc.). Preferred are polyvalent metals. The more preferred is at least a polyvalent metal selected from the group consisting of calcium, magnesium, barium, zinc, aluminum, and iron.

In the foam of the present invention, the proportion of the $\alpha$, $\beta$-unsaturated carboxylic acid constituting the metal salt-crosslinked cellular homopolymer or copolymer (A) is generally not less than 20% and preferably not less than 30% based on the metal salt-crosslinked cellular homopolymer or copolymer (A). If the proportion is less than 20%, the expansion ratio will be inadequate so that a low-density foam cannot be obtained and, moreover, the flame retardancy of the foam will be insufficient.

As mentioned hereinbefore, the foam of the present invention comprises a metal salt-crosslinked cellular homopolymer or copolymer (A) obtained by polymerizing a monomer charge comprising an $\alpha$, $\beta$-unsaturated carboxylic acid and optionally one or more other vinyl monomers, wherein at least part of said monomer charge is concurrently foamed and polymerized in the presence of a metal salt of carbonic acid. The technology for producing this foam includes:

(1) The process which comprises causing the starting material comprising an $\alpha$, $\beta$-unsaturated carboxylic acid, either alone or together with one or more other vinyl monomers, to undergo concurrent foaming and polymerization-crosslinking in the presence of a metal salt of carbonic acid and a polymerization initiator, where necessary, under heating.

(2) The process which comprises causing $\alpha$, $\beta$-unsaturated carboxylic acid homopolymer or copolymer (B), which has been prepared by polymerizing a part of the starting monomer charge beforehand, and the remainder of the $\alpha$, $\beta$-unsaturated carboxylic acid and/or other vinyl monomer to undergo concurrent foaming and polymerization-crosslinking in the presence of a metal salt of carbonic acid and a polymerization initiator, where necessary, under heating.

In the latter process, the preferred proportion of said $\alpha$, $\beta$-unsaturated carboxylic acid homopolymer or copolymer (B) prepared beforehand in the total monomer charge is from 20 to 80 weight %.

The process which comprises reacting an $\alpha$, $\beta$-unsaturated carboxylic acid homopolymer or copolymer, available from all of the starting monomers on polymerization beforehand, with a metal salt of carbonic acid for crosslinking and foaming is not recommendable, for the $\alpha$, $\beta$-unsaturated carboxylic acid homopolymer or copolymer is either a solid or a super-high-viscosity liquid which requires a melt-kneading extruder capable of operating at high pressure and high temperature and that the expansion ratio is only about 2 to 5 at best, thus failing to provide a low-density foam.

The practice of dissolving the $\alpha$, $\beta$-unsaturated carboxylic acid homopolymer or copolymer in water or an organic solvent to lower its viscosity and processing the solution with a low-pressure foaming machine or the like is not recommendable, either, for the foam strength will be so low as to result in collapse of cells, thus failing to provide a foam of acceptable quality.

The metal salt of carbonic acid acts as a crosslinking agent and as a foaming agent. In consideration of the compressive strength of the foam, the proportion of the metal salt of carbonic acid is generally not less than about 10 equivalent % and preferably not less than 20 equivalent % based on the carboxyl group of the $\alpha$, $\beta$-unsaturated carboxylic acid or $\alpha$, $\beta$-unsaturated carboxylic acid homopolymer or copolymer (B).

The polymerization initiator that can be used includes a variety of known radical polymerization initiators, e.g. oil-soluble radical polymerization initiators such as azobisisobutyronitrile (AIBN), benzoyl peroxide, etc., and water-soluble radical initiators such as azobiscyanovaleric acid, a salt of azobisamidinopropane, ascorbic acid-hydrogen peroxide (redox initiator), potassium persulfate- or sodium persulfate-sodium bisulfite (redox initiator). Preferred are water-soluble radical polymerization initiators.

In the above processes, the crosslinking-polymerization temperature is generally from 0 to 120° C. and preferably from room temperature to 90 ° C.

As the foaming agent, a variety of known foaming agents can be used in addition to said a metal salt of carbonic acid. For example, azide compounds such as sodium azide, azo compounds such as AIBN, azobiscyanovaleric acid, azodicarbonamide, a salt of azobisamidinopropane, etc., carbonates or bicarbonates of monovalent bases, such as ammonium carbonate, gases such as chlorofluorocarbons (Freon; trade name), butane gas, etc., low-boiling-point solvents, and water can be mentioned. Moreover, a blowing technology comprising introducing a gas physically into the charge by the mechanical froth method or the air loading method can be concomitantly applied.

In the foam of the present invention, other suitable ingredients may be incorporated. Among such ingredients are carbon black, ceramic fiber, metal whisker, glass fiber, sodium sulfate, titanium dioxide, PEG, dyes and pigments, chelating agents, fats, oils, surfactants, bentonite, cellulose, starch, and water.

The proportion of these optional additives that can be used are not particularly restricted but, from the standpoint of product foam quality, is generally not greater than 50 weight % and preferably not greater than 20 weight %.

The expansion ratio of the foam of the present invention can be liberally selected according to the intended application but, in consideration of foam quality, is generally 10 to 100, preferably 10 to 50, and for still better results, 10 to 40.

The foam of the present invention can be provided in the flame retardant grade corresponding to Grade 1 or 2 of JIS A-1321.

The foam of the present invention can be provided in a variety of finished shapes, such as plate, sheet, film, bar, cylinder, and so on. For the manufacture of these products, the reaction injection molding (RIM) and other conventional foaming or transfer molding technology, for instance, can also be utilized. Furthermore, the foam of the present invention can be subjected to coating and other surface treatments, perfuming finish, and other post-treatments. Uses for the foam may be structural members, protectors, heat insulators, soundproof materials, and so on.

The foam of the present invention has excellent antistatic, heat insulation, and soundproof properties, as well as high compressive strength even at low density. Moreover, its production does not involve the use of any environment-unfriendly material, nor does it involve evolution of noxious gases or soot due to incomplete combustion or excessive heat of combustion on incineration. Therefore, the foam of the present invention is not only useful as a heat insulator, structural member, protector, soundproof material, etc. but, after use, can be incinerated along with other refuses in an ordinary incinerator, thus being friendly to the environment and of use for wastes-fueled power generation.

EXAMPLES

The following examples are intended to illustrate the present invention in further detail and should by no means be construed as defining the scope of the invention. In the following description, all parts and % are by weight.

The symbols of the component materials used in the examples and comparative examples are as follows.

AAc: acrylic acid
PAAc: a 50% aq. solution of polyacrylic acid with a number average mol. wt. of ca 10000
HEA: 2-hydroxyethyl acrylate
HEMA: 2-hydroxyethyl methacrylate
AAc3E: addition product of acrylic acid with ethylene oxide (EO) (3 moles on the average)
MAAc2E: addition product of methacrylic acid with EO (2 moles on the average)
PBAAC: a butyl acrylate-acrylic acid copolymer with a number average mol. wt. of ca 10000 (content of acrylic acid =20 wt. %)
DHA: dipentaerythritol hexa-acrylate
Cell regulator: SZ-1627, Nippon Unicar Co. Ltd.

Examples 1 to 8

Mixture A, mixture B, ascorbic acid, and 35% hydrogen peroxide/water were mixed in the ratio indicated in Table 1 or 2 and placed in a vessel. Almost immediately, polymerization and foaming reactions took place, giving rise to a foam within a few minutes. The quality parameter values of the foam are shown in Tables 1 and 2.

Comparative Example 1

Mixture A and Mixture B (Table 2) were warmed to 80° C. and mixed in the indicated ratio and placed in a vessel. The vessel was allowed to sit in an oven at 100° C. for 20 minutes for foaming and crosslinking reactions to provide a foam. The quality parameter values of the foam are shown in Table 2.

Comparative Example 2

In a Bambury mixer, 40 weight parts of PBAAc pellets and 60 weight parts of calcium carbonate powder were kneaded to prepare a pelletized calcium carbonate master batch. This calcium carbonate master batch and PBAAc were extruded in the ratio indicated in Table 2 using a melt-kneading extruder at the extrusion rate of 10 kg/hr, resin pressure of 190 kg/cm$^2$, and resin temperature of 180° C. to provide a foam. The quality parameter values of the foam are shown in Table 2.

TABLE 1

|  |  | Example |  |  |  |  |  |
|---|---|---|---|---|---|---|---|
|  |  | 1 | 2 | 3 | 4 | 5 | 6 |
| Mixture A | AAc | 50 | 100 | 50 | 100 | 0 | 0 |
|  | PAAc | 0 | 0 | 0 | 0 | 100 | 100 |
|  | Water | 25 | 50 | 25 | 50 | 0 | 0 |
|  | HEA | 50 | 0 | 0 | 0 | 0 | 0 |
|  | HEMA | 0 | 0 | 50 | 0 | 0 | 0 |
|  | AAc3E | 0 | 0 | 0 | 0 | 50 | 0 |
|  | MAAc2E | 0 | 0 | 0 | 0 | 0 | 50 |
|  | DHA | 0 | 10 | 20 | 20 | 0 | 5 |
|  | Cell regulator | 0.5 | 0.5 | 0.5 | 0.5 | 0.5 | 0.5 |
| Mixture B | Na$_2$CO$_3$ | 0 | 0 | 0 | 5 | 0 | 0 |
|  | MgCO$_3$ | 20 | 0 | 0 | 0 | 10 | 10 |
|  | CaCO$_3$ | 10 | 30 | 20 | 10 | 40 | 40 |
|  | Water | 30 | 30 | 20 | 15 | 50 | 50 |
|  | Azodicarbonamide | 0 | 0 | 1 | 0 | 0 | 0 |
|  | Ascorbic acid | 0.1 | 0.4 | 0.2 | 0.6 | 0.6 | 0.6 |
|  | Hydrogen peroxide/water | 0.02 | 0.2 | 0.04 | 0.3 | 0.3 | 0.3 |
| Results | Density | 70 | 40 | 70 | 50 | 50 | 30 |
|  | Expansion ratio | 15 | 25 | 15 | 20 | 20 | 35 |
|  | Compressive strength | 3.0 | 2.0 | 3.5 | 2.5 | 3.0 | 1.5 |
|  | Flame retardancy |  |  |  |  |  |  |
|  | Combution speed | 0.5 | 0.8 | 1.0 | 0.7 | 0.7 | 0.8 |
|  | Tem.-time area | 40 | 0 | 95 | 20 | 28 | 20 |
|  | Emitting smoke factor | 44 | 25 | 58 | 30 | 34 | 26 |
|  | Afterflame time | 5 | 0 | 25 | 0 | 8 | 6 |
|  | Antistatic property | Excellent | Excellent | Excellent | Excellent | Excellent | Excellent |
|  | Heat conductivity | 0.04 | 0.04 | 0.04 | 0.04 | 0.04 | 0.04 |
|  | Soundproof property | 25 | 20 | 25 | 20 | 20 | 20 |

TABLE 2

|  |  | Example |  | Comparative Example |  |
|---|---|---|---|---|---|
|  |  | 7 | 8 | 1 | 2 |
| Mixture A | AAc | 0 | 0 | 0 | 0 |
|  | PAAc | 100 | 100 | 100 | 0 |
|  | Water | 0 | 0 | 100 | 0 |
|  | HEA | 0 | 0 | 0 | 0 |
|  | HEMA | 50 | 0 | 0 | 0 |
|  | MAAc2E | 0 | 50 | 0 | 0 |
|  | PBAAc | 0 | 0 | 0 | 100 |
|  | DHA | 20 | 5 | 0 | 0 |
|  | Cell regulator | 0.5 | 0.5 | 0.5 | 0.5 |
| Mixture B | Na$_2$CO$_3$ | 0 | 5 | 0 | 0 |
|  | MgCO$_3$ | 0 | 0 | 0 | 0 |
|  | CoCO$_3$ | 10 | 10 | 5 | 3 |
|  | Water | 10 | 15 | 5 | 0 |
|  | PBAAc | 0 | 0 | 0 | 2 |
|  | Azodicarbonamide | 5 | 0 | 0 | 0 |
|  | Ascorbic acid | 0.2 | 0.4 | 0 | 0 |
|  | Hydrogen peroxide | 0.04 | 0.2 | 0 | 0 |

TABLE 2-continued

|  |  | Example | | Comparative Example | |
|---|---|---|---|---|---|
|  |  | 7 | 8 | 1 | 2 |
|  | /water |  |  |  |  |
| Results | Density | 70 | 50 | 500 | 300 |
|  | Expansion ratio | 15 | 20 | 2.2 | 3.3 |
|  | Compressive strength | 3.5 | 2.5 | 4.5 | 5.5 |
|  | Flame retardancy |  |  |  |  |
|  | Combution speed | 1.0 | 0.7 | 5.2 | 5.8 |
|  | Tem.-time area | 80 | 30 | 210 | 360 |
|  | Emitting smoke factor | 57 | 45 | 150 | 250 |
|  | Afterflame time | 22 | 10 | 45 | 60 |
|  | Antistatic property | Excellent | Excellent | Good | Good |
|  | Heat conductivity | 0.04 | 0.04 | 0.10 | 0.12 |
|  | Soundproof property | 25 | 20 | 5 | 7 |

Density ($kg/m^3$): JIS K 6310
expansion ratio: a value dividing a value of true density of components constituting a foam by that of apparent density of a foam (apparent density: the weight of a foam/the volume thereof)
Compressive strength ($kg/cm^2$): JIS A 9514
Flame retardancy:
  Combustion speed (cm/min): JIS A 9514
  Temperature-time area (° C.·min): JIS A 1321
  Emitting smoke factor (CA): JIS A 1321
  Afterflame time (sec): JIS A 1321
Antistatic property: The antistatic property was tested at 25° C. and 50% R.H. and the result was evaluated on the 4-grade scale of excellent, good, fair, and poor (the sample inferior to the prior art foam was rated poor).
Heat conductivity (kcal/m·h·° C.): JIS A 9514
Soundproof property (dB): JIS A 1416

What is claimed is:

1. A foam consisting essentially of a polyvalent metal salt-crosslinked cellular homopolymer or copolymer (A) obtained by radically polymerizing in the presence of a cell regulator or a surfactant, a monomer charge consisting essentially of an α, β-unsaturated carboxylic acid and optionally at least one other vinyl monomer than said α, β-unsaturated carboxylic acid, wherein at least 50 weight % of said monomer charge is polymerized in the presence of a polymerization initiator, concurrently with crosslinking and foaming through a polyvalent metal salt of carbonic acid acting as a crosslinking agent and a blowing agent, the proportion of the α, β-unsaturated carboxylic acid constituting the polyvalent metal salt-crosslinked cellular homopolymer or copolymer (A) being not less than 30 weight % based on the weight of the polyvalent metal salt-crosslinked cellular homopolymer or copolymer (A) and sufficient to provide a flame retardancy grade of Grade 1 or 2 of JIS A-1321.

2. The foam according to claim 1, wherein not more than 50 weight % of said monomer charge is polymerized to prepare an α, β-unsaturated carboxylic acid homopolymer or copolymer (B), after which the remainder of said monomer charge is polymerized in the presence of said α, β-unsaturated carboxylic acid homopolymer or copolymer (B) and said polymerization initiator, concurrently with crosslinking and foaming through said polyvalent metal salt of carbonic acid, the α, β-unsaturated carboxylic acid homopolymer or copolymer (B) consisting essentially of not less than 30% by weight of units of said α, β-unsaturated carboxylic acid monomer and optionally units of at least one monomer other than said α, β-unsaturated carboxylic acid.

3. The foam according to claim 1, wherein said polyvalent metal is at least one member selected from the group consisting of calcium, magnesium, zinc, barium, aluminum, and iron.

4. The foam according to claim 1, wherein the expansion ratio of said foaming is from 10 to 50.

5. The foam according to claim 1, wherein said α, β-unsaturated carboxylic acid is selected from the group consisting of acrylic acid, methacrylic acid, itaconic acid, maleic acid, fumaric acid, cinnamic acid and salts thereof.

6. The foam according to claim 1, wherein said other vinyl monomer consists essentially of at least one member selected from the group consisting of water-soluble monovinyl monomers and polyfunctional vinyl monomers.

7. The foam according to claim 6, wherein said water-soluble monovinyl monomer is selected from the group consisting of (meth)acrylamide, vinylpyrrolidone, hydroxyethyl (meth)acrylate, addition product of (meth)acrylic acid with an alkylene oxide, (meth)acryloyl polyoxymethylenemethyl ether, 2-(meth)acryloxyamino-2-methylpropane sulfonic acid and vinylsulfonic acid.

8. The foam according to claim 6, wherein said polyfunctional vinyl monomer is selected from the group consisting of ethylene glycol di(meth)acrylate, polyethylene glycol di(meth)acrylate, propylene glycol di(meth)acrylate, polypropylene glycol di(meth)acrylate, trimethylolpropane poly(meth)acrylate, glycerol poly(meth)acrylate, pentaerythritol poly(meth)acrylate, diallyl phthalate ethylene glycol diallyl ether and polyethylene glycol diallyl ether.

9. A foam which is used for a heat insulator, structural member, protector, or soundproof material, consising essentially of a polyvalent metal salt-crosslinked cellular homopolymer or copolymer (A) obtained by radically polymerizing in the presence of a cell regulator or surfactant, a monomer charge consisting essentially of an α, β-unsaturated carboxylic acid and optionally at least one other vinyl monomer than said α, β-unsaturated carboxylic acid, wherein at least 50 weight % of said monomer charge is polymerized in the presence of a polymerization initiator, concurrently with crosslinking and foaming through a polyvalent metal salt of carbonic acid acting as a crosslinking agent and a blowing agent, the proportion of the α, β-unsaturated carboxylic acid constituting the polyvalent metal salt-crosslinked cellular homopolymer or copolymer (A) being not less than 30 weight % based on the weight of the polyvalent metal salt-crosslinked cellular homopolymer or copolymer (A) and sufficient to provide a flame retardancy grade of Grade 1 or 2 according to JIS A-1321.

* * * * *